July 6, 1965
W. H. WILSON
3,192,773
AUTOMATIC GRAIN BIN SAMPLER
Filed March 20, 1961
3 Sheets-Sheet 1
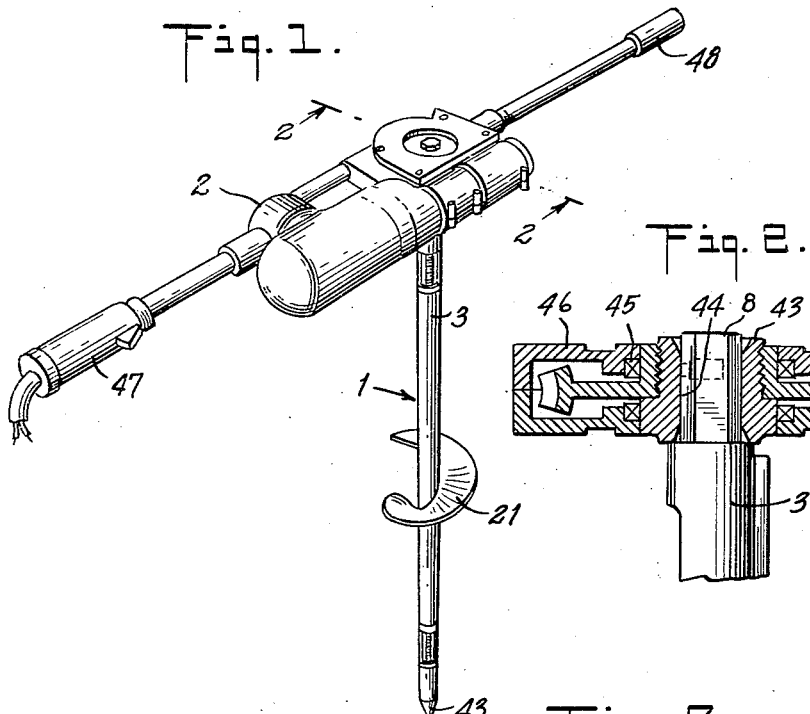
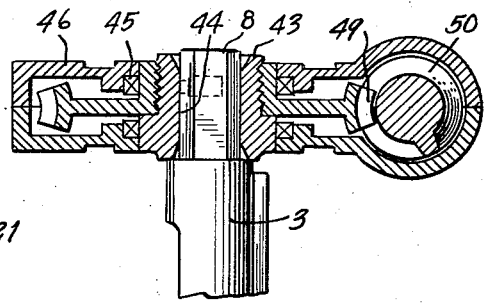
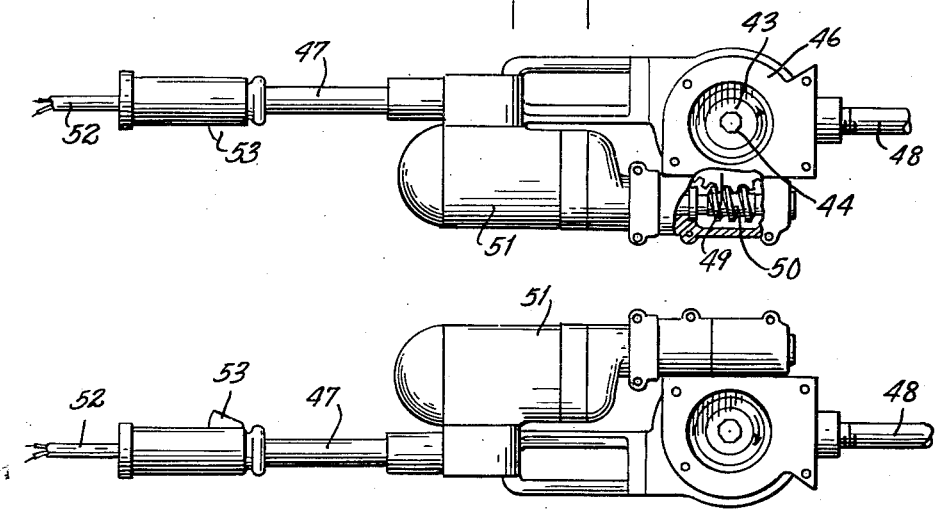
INVENTOR.
WILLIAM H. WILSON
BY
Kenyon & Kenyon
ATTORNEYS July 6, 1965 W. H. WILSON 3,192,773
AUTOMATIC GRAIN BIN SAMPLER
Filed March 20, 1961 3 Sheets-Sheet 2
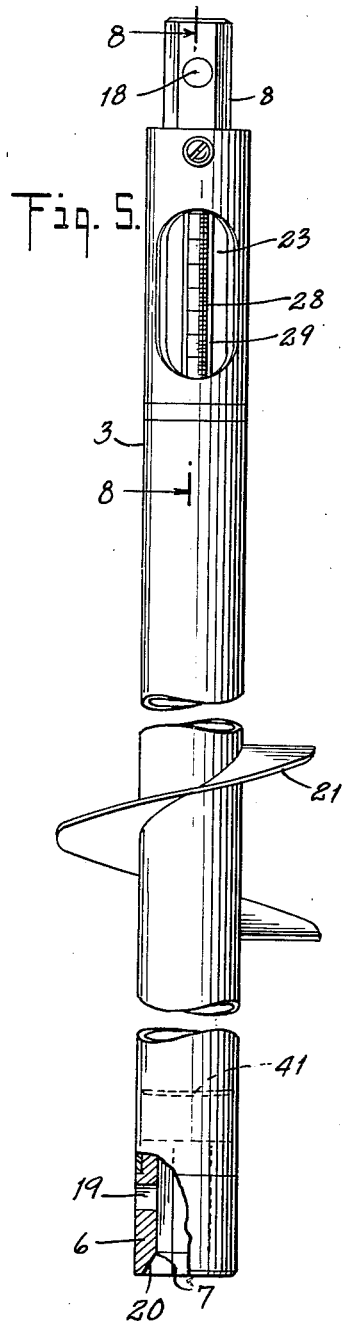
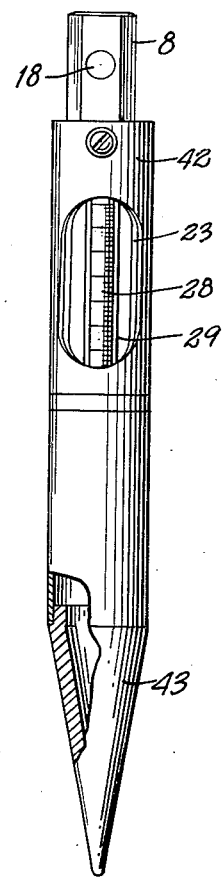
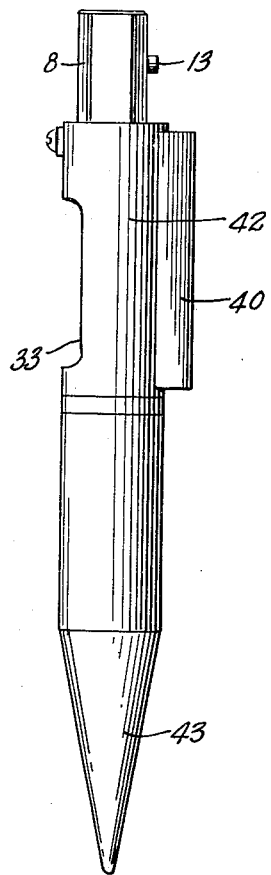
INVENTOR.
WILLIAM H. WILSON
BY
ATTORNEYS July 6, 1965  W. H. WILSON  3,192,773
AUTOMATIC GRAIN BIN SAMPLER
Filed March 20, 1961  3 Sheets-Sheet 3
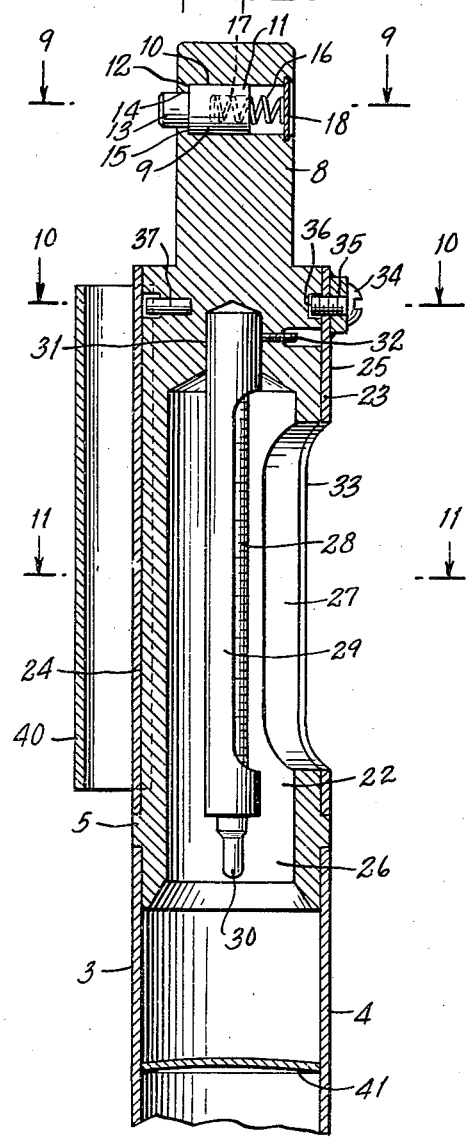
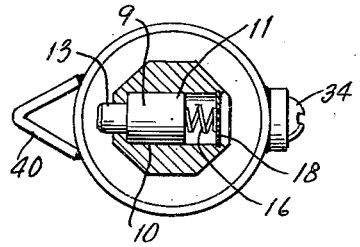
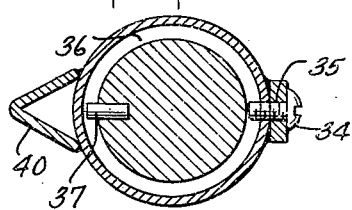
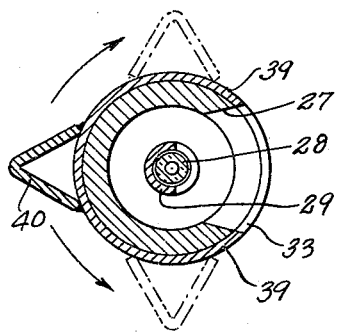
INVENTOR.
WILLIAM H. WILSON
BY Kenyon & Kenyon
ATTORNEYS

United States Patent Office 3,192,773
Patented July 6, 1965

3,192,773
AUTOMATIC GRAIN BIN SAMPLER
William H. Wilson, 217 W. Second, Hutchinson, Kans.
Filed Mar. 20, 1961, Ser. No. 96,820
5 Claims. (Cl. 73—425.2)

This invention relates to apparatus for testing samples of grain stored in bulk as in elevators and bins and for obtaining temperature readings on the grain at various places in the body of the grain.

One of the objects of this invention is to provide a probe that can be easily inserted into a body of grain and which can simultaneously obtain samples of grain and temperature readings at various depths and which is simple in construction and easily operated and can be used even in the elevators or bins where there is little room at the top of the grain in the elevator or bin.

Another object is to provide a power-driven probe that is useful in grain bodies of material depth, which probe comprises a plurality of sections that may be easily assembled seriatim as the probe progresses into the grain.

Another object is to provide a power-driven probe that can be used with a minimum of fire risk.

Other objects and advantages will be apparent from the description to follow of a preferred form of the invention which has proven effective in use and which has been selected as illustrative of the invention which, however, is not limited to this specific form.

FIG. 1 is a perspective view of a probe embodying the invention;

FIG. 2 is a sectional view of the power unit and its connection to the probe taken in the line 2—2 of FIG. 1;

FIG. 3 is a top plan view of the probe and power unit as shown in FIG. 1, showing the unit in position to drive the probe into a body of grain;

FIG. 4 is a view similar to FIG. 3 showing the power unit in position to drive the probe for removal from a body of grain;

FIG. 5 is a view of a section of the probe;

FIG. 6 is a view of the tip of the probe;

FIG. 7 is a view taken from the right of FIG. 6;

FIG. 8 is a view in section of the end of a section of the probe taken on the line 8—8 of FIG. 5;

FIG. 9 is a sectional view taken on the line 9—9 of FIG. 8;

FIG. 10 is a sectional view taken on the line 10—10 of FIG. 8, and

FIG. 11 is a view taken on the line 11—11 of FIG. 8, showing the position of the shutter on rotation of the probe.

The invention consists generally of a probe comprising a plurality of sections adapted to be connected together in end to end relationship by easily disconnectable connectors adapted to transmit rotary movement. These have squared interfitting male and female members. One or more of the sections has a helical or screw-like feeding member adapted to feed the probe into and out of the grain depending upon direction of rotation.

The driving unit is motor driven and has a driven member having a connector adapted to fit the connector of the end of any of the sections so that the probe may be fed into the grain by driving one section in, removing the power unit, connecting a section to the section already in the grain, connecting the power unit to the free end and thus progressively feeding the probe into the grain. This process is reversed for removing the probe.

In the preferred form of the invention, the driver of the power unit has a squared female coupling and the free end of the sections has the male coupler so that for removal of the probe it is only necessary to remove the power unit, turn it over and re-engage the coupler to reverse the drive on the probe. This makes it possible to use a non-reversing motor wound so as to eliminate or reduce danger of sparking or arcing and fire hazard attendant thereon.

The sampling of grain and temperature is accomplished by unique sample chambers each having a recording thermometer and provided with a shutter which is activated by rotation of the probe. One such chamber is provided on each section in the preferred form of the invention so that samples can be taken simultaneously at lengths equivalent to the lengths of the sections.

The sample chambers are generally cylindrical in form and have a lateral port. Each has a shutter mounted for rotation about the axis of cylindrical chamber. Each shutter has a central port adapted to register with the port of the chamber when the shutter is in intermediate position and having a pair of wall portions one on each side, each end adapted to close the port of the chamber when the shutter is moved to its side of the intermediate position. The shutter is provided with a vane extending axially on the outside of the shutter and adapted to engage in the body of the grain when inserted therein. This vane tends to anchor the shutter against rotation when the probe is inserted in the grain. Stops limit the relative rotary movement of the shutter and the chamber. Thus, when the probe is inserted and rotated, the vane will engage the grain and hold the shutter against one stop, closing the port of the chamber. When the probe has been screwed into the grain the desired distance, it is rotated back just enough to move the port of the chamber into registry with the port in the shutter. Grain enters the port. Further, a reverse rotation closes the port and the vane holds the shutter in port closing position as the probe is screwed out of the grain.

Referring to the drawings, the probe is shown generally at 1 and the driving unit is shown at 2. The probe is made up of a plurality of sections 3, each of which in the form of invention shown, comprises a metallic tube 4 having machined members 5 and 6 secured at its ends in any suitable manner not shown in detail, each comprising a coupling member for connecting each section 3 to a like section in end to end and non-rotative relationship.

The fitting 6, as seen in FIG. 5, is the female member having a squared recess 7, hexagonal in form, to receive an interfitting male member on the next adjacent section.

The fitting 5 has at its free end a squared, in this case hexagonal, coupling member 8 adapted to fit into the recess 7 or one like it to couple two sections in end-to-end non-rotative relationship.

To connect the sections against axial separation, the male coupling member is provided with a spring-pressed easily disengaging fastener comprising a plunger 9 slidably mounted in a cross bort 10. The plunger comprises a body 11 having a shoulder 12 and a projecting nose 13 of lesser diameter than the body 11. The nose 13 projects through an aperture 14 of lesser diameter than the bore 10 and the shoulder 12 bears against shoulder 15. The plunger is spring-pressed by compression spring 16 which extends into bore 17 in plunger 9 and bears at its other end on plate 18 which closes the end of bore 10.

The nose 13 projects into bore 19 which communicates with socket 7 through fitting 6 as shown in FIG. 5. The inlet to the socket 7 is chamfered as shown at 20, to facilitate assembly of the sections.

At least one of the sections is provided with a helical screw member 21 to drive the probe into or out of the body of grain depending upon the direction of rotation.

Each section is provided with a grain sample receiving chamber which, in the form of invention shown in the drawings, is formed of a hollow cylindrical portion 23 formed from the fitting 5 formed by machining the outside to form a cylindrical bearing 24 for a shutter 25 which is generally cylindrical in form and is mounted for rotation about the axis of the chamber which extends axially of the probe.

The chamber is formed by a bore 26 extending axially of the fitting 5 and has a lateral port 27 which opens through the portion 24 of the fitting 5.

A recording thermometer 28 is fixed in a casing 29 with the bulb 30 exposed. The casing is fitted in a bore 31 held in position by a set screw 32.

The shutter 25 is generally in the form of a cylindrical tube fitted rotatably over the bearing 24. It has a lateral port 33 of the same size as the lateral port 27 in the grain-receiving chamber.

The shutter 25 is retained in position by a set screw 34 screwed in a threaded hole 35 in the shutter and projecting into a circumferential groove 36 which extends around the fitting 5 and a stop pin 37 inserted in groove 36 which serves as a stop to limit rotation of said shutter around the bearing 24.

The port 27 is diametrically opposite to stop pin 37 in the groove 36 and the port 33 is in line axially with the screw 34. On each side of the port 33 is a closure wall adapted to close port 27 when the shutter is rotated to either end of its movement with respect to the bearing 24 when the screw 34 is against either side of pin 37 in the slot 36. When the screw 34 and port 33 are in an intermediate position between the limiting ends of the movement, the port 33 is aligned with and in register with the port 27 to permit ingress to the chamber.

A fin 40 extends laterally from the exterior of the shutter and generally axially of the shutter and is adapted to engage in the grain of a body of grain into which the probe is inserted. This tends to anchor the shutter against rotary movement when the probe is rotated until the shutter closes port 27 with either of the walls 39 and the screw engages the stop pin 37 in the groove 36. Thereafter, rotation of the probe carries the shutter but holds it in closed position with respect to the chamber.

Thus, when inserting the probe into the grain, the shutter on each section is moved into its closed position. As the probe is rotated, the helix feeds it into the grain and the shutters are held in position closing the chambers. When the probe has reached the desired depth, it is rotated in reverse till the ports 27 and 33 are in register. Grain then simultaneously flows into and fills the chambers at each section. Further rotation of the probe in a reverse direction then closes the ports 27 and when the shutters reach the limiting position further rotation and the pressure of the grain on the vanes 40 keep the shutters in closed position. When the probe is removed from the grain body, the sample may be taken from each chamber by turning the shutter to the intermediate position and the temperature of the grain at the depth represented by the sample is recorded on the thermometer.

The bore 26 and tube 4 are closed by a plug 41 located near the lower end of tube 4 to permit the taking of a large sample. A nose-piece 42, which is similar to the fitting 5 in all respects and with a male coupling member 8 like the member 8 of FIG. 8, but with a pointed end 43 in place of the tube 3 of FIG. 8, is provided for the lower end of the probe to facilitate entry into the grain.

The driving unit which is adapted to engage the squared coupling 8 consists of a driving member 43 having a squared central through aperture 44 which is shown as hexagonal to fit one of the square male coupling members 8 when said member is inserted from either side of the aperture.

This driving member is supported for rotation in a bearing 45 in a casing 46 which is provided with handles 47 and 48 to hold it against rotation when engaged with a probe. Handle 48 is easily detachable to permit ease of carrying. A driving worm gear 49 is secured to the driving member 43 and engages the worm 50 which is mounted for rotation in the casing 46 and is connected to the motor 51 which is also mounted in the casing 46.

A line 52 and switch 53 are provided to control the motor which is a universal wound motor which is not, however, provided with a reversing switch as its electrical axis and mechanical axis are the same. Although this motor has brushes which might cause some arcing, by eliminating the reversing switch and circuitry, the possibility of arcing is kept to a minimum.

It has been found necessary to provide such a motor in order to have the necessary power for driving the mechanism and although fire hazard is not completely eliminated, by eliminating the reversing switch the hazard is greatly reduced. This has been done by making it possible to reverse the position of the driving unit as described below in order to reverse the drive on the probe.

Since the motor is not reversible for the reason set forth above, the driving of the probe into the grain is done as shown in FIG. 4, which is a plan view of the probe in position.

When one wishes to reverse the rotation of the probe, the driving unit is removed and reversed to the position shown in FIG. 3 and FIG. 1. The arrows on the member 43 show the direction of rotation.

By utilizing the sectional probe above described, it is possible to insert a probe into grain in an elevator or bin with very little headroom above the grain. The necessary number of sections can be used to reach the bottom of the body of grain with sections being added as insertion progresses.

The chambers remain closed until it is desired to open them to receive grain and the remote control opening of the chambers is achieved with an extremely simple mechanism requiring no extended controls.

The form of invention shown above and described is to be considered illustrative of the invention which is not to be limited to the specific form shown and described. The appended claims define the scope of the invention.

I claim:

1. A grain sampling device comprising a shaft adapted to be inserted in a body of grain including a longitudinally extending hollow cylindrical portion comprising a sample receiving chamber having a lateral port for ingress to said chamber, and a shutter for controlling ingress to said port comprising a shell mounted for rotation around said cylindrical portion having a central aperture adapted to be moved into registry with said port and having closure walls on each side of said aperture adapted to close said port on relative rotary movement between said shell and cylindrical portion to position said aperture on either side of said port, said shell having a fin extending laterally of and generally longitudinally of the exterior of said shell and adapted to engage in the grain of a body thereof on insertion of said cylindrical portion in said body of grain whereby rotation of said shaft will cause relative rotary motoin between said shell and said cylindrical portion to either open said port or close it with either one or the other of said closure walls and stop means on said shell and cylindrical portion to terminate relative rotary motion between said shell and cylindrical portion to stop said shell in port closing position on rotation of said shaft in either direction to a position to close said port by either closing wall and to maintain said shell in port closing position on continued rotation in the same direction and auger means to feed said shaft into a body of grain on rotation thereof and means to rotate said shaft.

2. A grain sampling device comprising a plurality of shafts adapted to be inserted in a body of grain each including a longitudinally extending hollow cylindrical portion comprising a sampling receiving chamber having a lateral port for ingress to said chamber, and a shutter for controlling ingress to said port comprising a shell mounted for rotation around said cylindrical portion having a central aperture adapted to be moved into registry with said port and having closure walls on each side of said aperture adapted to close said port on relative rotary movement between said shell and cylindrical portion to position said aperture on either side of said port, said shell having a fin extending laterally of and generally longitudinally of the exterior of said shell and adapted to engage in the grain of a body thereof on insertion of said cylindrical portion in said body of grain whereby rotation of said shaft will cause relative rotary motion between said shell and said cylindrical portion to either open said port or close it with either one or the other of said closure walls and stop means on said shell and cylindrical portion to terminate relative rotary motion between said shell and cylindrical portion to stop said shell in port closing position on rotation of said shaft in either direction to a position to close said port by either closing wall and to maintain said shell in port closing continued rotation in the same direction, each shaft having quick detachable mating connecting means at each end adapted to join said sections together in end to end relationship for transmitting rotary motion from one to another, auger means for feeding said shafts on rotation into a body of grain and means for rotating said shafts comprising a driving unit comprising a driving member having quick detachable means adapted to engage the connecting means on said shafts to impart a rotary motion to said shaft whereby said driving means may be quickly and detachably connected to the end of the shaft most remote from the first shaft to enter the grain to impart rotary motion to all of the shafts and to the next shaft to be connected as the sampler goes deeper into the grain, and a motor operatively connected to said driving member.

3. A grain sampling device comprising a plurality of shafts adapted to be inserted in a body of grain including a hollow portion comprising a grain receiving chamber having a lateral port for ingress of grain, a shutter controlling said port movable from a central position where said port is open to positions on either side thereof where the port is closed, and shutter actuating means comprising a rib extending generally longitudinally of the exterior of said shaft and movable generally circumferentially of said shaft and engageable by the grain of the body of grain into which the shaft is inserted whereby on inserting of said shaft into a body of grain and rotation of said shaft the shutter is maintained in closed position, may be moved to open position and then closed by rotation of said shaft in a reverse direction and will be maintained in closed position by continued rotation in the reverse direction, each shaft having quick detachable mating connecting means at each end adapted to join said sections together in end to end relationship for transmitting rotary motion from one to another, auger means for feeding said shafts on rotation into a body of grain and means for rotating said shafts comprising a driving unit comprising a driving member having quick detachable means adapted to engage the connecting means on one of said shafts to impart a rotary motion to said shaft whereby said driving means may be quickly and detachably connected to the end of the shaft most remote from the first shaft to enter the grain to impart rotary motion to all of the shafts and to the next shaft to be connected as the sampler goes deeper into the grain and a motor operatively connected to said driving member.

4. A grain sampling device comprising a plurality of shafts adapted to be joined together in end to end relationship for rotation as a unit, each including a longitudinally extending hollow cylindrical portion comprising a sample receiving chamber having a lateral port for ingress to said chamber, and a shutter for controlling ingress to said port comprising a shell mounted for rotation around said cylindrical portion having a central aperture adapted to be moved into registry with said port and having closure walls on each side of said aperture adapted to close said port on relative rotary movement between said shell and cylindrical portion to position said aperture on either side of said port, said shell having a fin extending laterally of and generally longitudinally of the exterior of said shell and adapted to engage in the grain of a body thereof on insertion of said cylindrical portion in said body of grain whereby rotation of said shaft will cause relative rotary motion between said shell and said cylindrical portion to either open said port or close it with either one or the other of said closure walls and stop means on said shell and cylindrical portion to terminate relative rotary motion between said shell and cylindrical portion to stop said shell in port closing position on rotation of said shaft in either direction to a position to close said port by either closing wall and to maintain said shell in port closing continued rotation in the same direction, each having a squared male coupling member at its upper end and a squared socket at its lower end adapted to fit the male coupling member of another shaft, an auger means on one shaft for feeding the shafts into a body of grain and means for rotating said shafts comprising a driving unit having a frame, a driving member mounted for rotation on said frame, and having a through aperture adapted to receive one of the male coupling members of said shafts, from either end thereof, a non-reversing motor and means connecting said motor in driving relationship to said driving member whereby said motor may drive said shafts in either direction depending upon which end of said squared aperture is engaged on the coupling member of the end shaft.

5. A grain sampling device comprising a plurality of shafts adapted to be joined together in end to end relationship for rotation as a unit, each including a hollow portion comprising a grain receiving chamber having a lateral port for ingress of grain, a shutter controlling said port movable from a central position where said port is open to positions on either side thereof where the port is closed, and shutter actuating means comprising a rib extending generally longitudinally of the exterior of said shaft and movable generally circumferentially of said shaft and engageable by the grain of the body of grain into which the shaft is inserted whereby on inserting of said shaft into a body of grain and rotation of said shaft the shutter is maintained in closed position, may be moved to open position and then closed by rotation of said shaft in a reverse direction and will be mounted in closed position by continued rotation in the reverse direction, each having a squared male coupling member at its upper end and a squared socket at its lower end adapted to fit the male coupling member of another shaft, an auger means on one shaft for feeding the shafts into a body of grain and means for rotating said shafts comprising a driving unit having a frame, a driving member mounted for rotation on said frame and having a through aperture adapted to receive one of the male coupling members of said shafts, from either end thereof, a non-reversing motor and means connecting said motor in driving relationship to said driving member whereby said motor may drive said shafts in either direction depending upon which end of said squared aperture is engaged on the coupling member of the end shaft.

References Cited by the Examiner

UNITED STATES PATENTS

| 1,078,847 | 11/13 | Grauenfels | 73—425.2 |
| 1,229,273 | 6/17 | James et al. | 73—425.2 |
| 2,331,227 | 10/43 | Proudlock | 73—425.2 |
| 2,693,728 | 11/54 | Shaff | 81—58 |

FOREIGN PATENTS 458,384  8/13  France.

RICHARD C. QUEISSER, *Primary Examiner.*

ROBERT L. EVANS, JOSEPH P. STRIZAK, *Examiners.*